United States Patent [19]

Barker et al.

[11] Patent Number: 4,778,529
[45] Date of Patent: Oct. 18, 1988

[54] CEMENTITIOUS COMPOSITIONS COMPRISING A WATER SOLUBLE POLYMER AND A CROSS-LINKING AGENT THEREFOR

[75] Inventors: Howard A. Barker, Horsham; Eric A. Rirsch, Billinghurst; John Maxfield, Worthing, all of United Kingdom

[73] Assignee: Redland Technology Limited, Surrey, United Kingdom

[21] Appl. No.: 917,862

[22] Filed: Oct. 14, 1986

[30] Foreign Application Priority Data

Oct. 18, 1985 [GB] United Kingdom ............ 8525723

[51] Int. Cl.$^4$ .............. C04B 16/02; C04B 16/04; C04B 24/34; C04B 24/38
[52] U.S. Cl. .............................. 106/93; 106/94; 524/4; 524/5; 524/6; 524/650
[58] Field of Search ............ 106/93, 94; 524/4, 5, 524/6, 650

[56] References Cited

U.S. PATENT DOCUMENTS

| | | | |
|---|---|---|---|
| 2,053,842 | 9/1936 | Rice | 106/93 |
| 3,215,549 | 11/1965 | Ericson | 106/93 |
| 3,272,771 | 9/1966 | Busche et al. | 524/5 |
| 4,330,441 | 5/1982 | Böhmer et al. | 106/93 |
| 4,501,830 | 2/1985 | Miller et al. | 106/90 |
| 4,515,216 | 5/1985 | Childs et al. | 106/93 |

FOREIGN PATENT DOCUMENTS

| | | |
|---|---|---|
| A10038126 | 10/1981 | European Pat. Off. . |
| A10039617 | 11/1981 | European Pat. Off. . |
| A2300206 | 7/1973 | Fed. Rep. of Germany . |
| A13426870 | 2/1985 | Fed. Rep. of Germany . |
| 1563190 | 3/1980 | United Kingdom . |

OTHER PUBLICATIONS

European Search Report on EP 86308093.3.

*Primary Examiner*—William R. Dixon, Jr.
*Assistant Examiner*—David M. Brunsman
*Attorney, Agent, or Firm*—Beveridge, DeGrandi & Weilacher

[57] ABSTRACT

An uncured cementitious composition comprising in admixture:
(a) at least one hydraulic cement;
(b) at least one reactive water-soluble polymer which is capable of providing a viscous solution in water at low addition levels;
(c) water in an amount of from 10 to 25 parts by weight of water per 100 parts by weight of the cement; and
(d) a water soluble cross-linking agent capable of effecting chemical cross-links between molecules of the said polymer in the presence of the cement and water.

34 Claims, No Drawings

CEMENTITIOUS COMPOSITIONS COMPRISING A WATER SOLUBLE POLYMER AND A CROSS-LINKING AGENT THEREFOR

BACKGROUND OF THE INVENTION

The invention relates to cementitious compositions and products made from such compositions. More particularly, the invention relates to substantially clay-free compositions comprising a hydraulic cement, water, a water-soluble polymer and a cross-linking agent for said polymer. It is to be understood that the compositions according to this invention are substantially clay-free.

By the term "reactive water-soluble polymer" in this specification is meant any water-soluble or water dispersible polymer or mixture of such polymers which can be reacted with an appropriate cross-linking agent to cause the polymer to become insoluble, or substantially so, in products made from the cementitious compositions of this invention.

By the term "hydraulic cement" in this specification, there is meant any material which sets and hardens by the addition of water, that is in the presence of water. The hydraulic cement may, for example, be a silicate cement such as Portland cement or it may be an aluminate cement. The term includes mixtures of two or more different hydraulic cements.

In making cementitious products, it is desirable that the resultant product should be of high strength and especially high flexural strength. This is particularly important when the products are to be used as building products, for example roofing slates, and for use in such applications it is desirable that the products should not only have a flexural strength of at least 15 MPa and advantageously 40 MPa, but also good durability, i.e. good resistance to:

(a) variations in climatic conditions particularly freeze-thaw conditions and cycles of alternate rain and sunshine;
(b) ultra-violet attack;
(c) acid rain; and,
(d) abrasion of surfaces by the elements such that the strength of the building product is maintained satisfactorily throughout its life.

Cementitious products produced from an hydraulic cement paste consisting of hydraulic cement and water only generally have low strength, especially low flexural strength, and poor durability. For example, a product formed from a cementitious composition which comprises an ordinary hydraulic cement with a typical spread of particle size range and an amount of water which is conventionally used in such compositions may have a flexural strength as low as 5 to 10 MPa. Moreover unless substantial amounts of aggregate (i.e. sand or crushed rock or the like) are incorporated into such cementitious products they will not normally be durable in natural weathering conditions.

DISCUSSION OF THE PRIOR ART

Various proposals have been made for improving the strength of such cementitious compositions. For example, it is known that the flexural strength and/or impact strength of a product formed from such a composition may be improved by including a fibrous material in the composition. Such fibre-reinforced-cement pastes are also sometimes acceptably durable in natural weathering conditions, the best known example being asbestos-cement products.

Fibrous materials which have been used in the past to increase the flexural strength of cementitious products include fibres of asbestos, glass, steel, ceramic, polymeric and vegetable materials. The use of such fibres does, however, have certain disadvantages. The flexural strength of products made from compositions including such materials may be appreciably increased to a figure of the order of 40 MPa in the short and medium terms; however, in the long term the presence of the fibrous material may not be entirely satisfactory because fibres may suffer degradation due to alkali attack, which coupled with long term weathering may also adversely affect the durability of the finished product. Moreover, the use of such fibres may add to the difficulty of processing the cementitious composition and in the case of some fibres, for example, asbestos, may involve health hazards.

A number of proposals have also been made for improving the strengths of cementitious products. For example, capital intensive high pressure forming, compaction and vibration apparatus may be employed to produce products having low porosity and high flexural strength. Such proposals have been utilised for forming products from cement pastes, mortars and ceramic materials. A further proposal involves the addition of processing aids to the composition which enables the elimination, to a great extent, of voids in products made from such compositions. The only processing aids which have been found to be suitable for this purpose are water-soluble polymers and proposals for their use have been made particularly in the case of compositions having a low water/cement ratio, for example, below 30 parts by weight of water per 100 parts of the hydraulic cement. Examples of polymers which have been described in the prior art as processing aids include especially cellulose ethers and also polyacrylamides and hydrolysed polyvinyl acetates. Proposals for using such processing aids have described using up to 25% by weight of the processing aid in a cement/water composition.

Examples of published Patent Specifications describing cementitious compositions and products of the above type are British Patent Specification No. 1563190 and the following European Patent Specifications Nos. 0021681, 0021682, 0030408, 0038126, and 0055035.

A large number of the compositions described in these patent specifications suffer from the drawback that they include a relatively large proportion of the processing aids.

It is believed that the improved micro-structure and increase in strength of products made from such compositions results in part from the effect of the polymers on the rheology of the composition. However, it has been proposed that, in cured or hardened products obtained from the compositions, the polymers act as an adhesive between the cementitious entities of the composition. The strength of the bond provided by the polymer adhesive, however, depends, amongst other factors, upon the water content of the composition. Ultimately, therefore, there will be a complete loss of strength because the polymer may re-dissolve or otherwise become less effective if sufficient water is available. Thus, a number of the compositions described in the specifications listed above, while possessing relatively high initial flexural strength when dry, do not have adequate strength when wet or adequate durability for use as building products. This has been demonstrated for the products made from such compositions by the marked decrease in flexural strength when tested under conditions simulating those experienced by building products, for example in water absorption tests or tests involving repeated freezing and thawing of the products and tests involving repeated wetting and drying.

SUMMARY OF THE INVENTION

We have found that products with relatively small amounts of water-soluble polymer are less susceptible to attack by water, i.e. the hardened composition has a low strength when saturated with water compared to the strength thereof in the dry state, or such products may also suffer gradual loss of strength during exposure to water or they will break down when subjected to freeze-thaw conditions even though such products are superior to those taught by the prior art.

We have now found surprisingly that significant improvement in strength can be obtained by the use of a cross-linking agent in conjunction with a reactive water-soluble polymer.

DETAILED DESCRIPTION OF THE INVENTION

Accordingly, the present invention provides an uncured cementitious composition comprising in admixture:
 (a) at least one hydraulic cement;
 (b) at least one reactive water-soluble polymer which is capable of providing a viscous solution in water at low addition levels as hereinbefore defined;
 (c) water in an amount of from 10 to 25 parts by weight of water per 100 parts by weight of the cement; and
 (d) a water soluble cross-linking agent capable of effecting chemical cross-links between molecules of the said polymer in the presence of the cement and water.

The water-soluble polymer is preferably capable of giving a viscosity exceeding 50 cps as a 5.0% solution by weight in water. Also it is preferred that the composition contains from 0.2, and more preferably 0.5 to 5 parts by weight of the water-soluble polymer per 100 parts per weight of the cement.

The water-soluble polymer to be used in the practice of this invention has to be reactive so that the cross-linking agent is able to react with the molecules of the polymer to insolubilise the polymer by forming the cross-links. It will be appreciated that a cross-linking agent which is very reactive with water is unsuitable for this purpose.

In the present invention the susceptibility to water is overcome by the use of the cross-linking agent, rendering the polymer insoluble in water and reducing the absorption of water and loss of strength of the products. Further benefits that may be derived from the addition of such cross-linking agents are (a) modifications to rheology of the mix which may assist in processing, (b) the formation of chemical links between two or more polymers used simultaneously in the mix, (c) formation of chemical links between the polymer and a fibrous reinforcement such as cellulose fibres, (d) a shortening of the time required to harden and develop strength in the cementitious composition, particularly when hot pressing is employed as the shaping method for the final product, and (e) formation of chemical bonds between cement and polymer.

In order for the polymer to fulfil the above functions a uniform concentration of polymer in the cement must first be obtained. It is known that cellulose ethers can give inhomogeneous aqueous solutions which can be overcome by partial cross-linking to delay or eliminate solubility. An alternative method to delay solubility and obtain a uniform solution is to predisperse the polymer in a weak solvent which is also miscible with water. An example would be polyacrylamide predispersed in alcohol. Lower water content cement systems at high polymer concentration can be prepared in accordance with this invention using a weak solvent which would not be possible by standard dissolution techniques.

However, if the polymer cross-linking reaction proceeds too rapidly for full dispersion a non-uniform concentration of cross-linked polymer is obtained and this results in a product which does not have the desired properties. An example of this would be the reaction of polyacrylamide with glyoxal at temperatures between 15° and 30° C. Thus, it is also a feature of the present invention that cross-linking may proceed at a rate which allows complete uniform dissolution of the polymer in the cementitious mixture.

Cross-linking of water-soluble polymers can be achieved by condensation with difunctional reagents, free radical reaction at unsaturated carbon-carbon double bonds, and complexing reagents with polyvalent ions. These mechanisms can be illustrated by the behaviour of cellulose ethers as described below.

Cross-linking of cellulose ethers may be accomplished by condensation reaction through hydroxol groups. Under the alkaline conditions which exist during the mixing and hardening process for most hydraulic cements we have found that this reaction can be carried out with, for example;
 (a) labile chlorine reagents
 (b) sulphones
 (c) epoxides Alternatively, cellulose ethers may be modified so that they can be cross-linked by a free radical mechanism. For example, modification can be introduced by reaction with allyl halides to introduce unsaturation which then serves as an active site for reaction which can be initiated later. Hydroxy-propylmethyl cellulose can be reacted with acrylamide monomers, such as methylene bis-acrylamide at around 70° C. in alkaline conditions to form a water insoluble cross-linked polymer. Also, cross-linking reagents can be chosen that react only at elevated temperatures with the polymer, do not alter the characteristics of the forming process, and are compatible with the other stages of processing such as hot pressing.

Accordingly, in practising the invention the reactive water-soluble polymer and the water-soluble cross-linking agent preferably, consist of at least one of the following pairs:
 (a) a cellulose ether plus a diepoxide;
 (b) a cellulose ether plus a sulphone;
 (c) a cellulose ether plus a compound containing labile chlorine;
 (d) a cellulose ether plus ethylene imine;
 (e) a carboxycellulose ether with polyvalent cation;
 (f) polyacrylamide, or a derivative thereof or a copolymer of acrylamide plus a dialdehyde;
 (g) polyvinylalcohol or partially hydrolised polyvinlacetate plus an inorganic acid;

(h) gelatin plus formaldehyde;

(i) polyacrylic acid or polyacrylic acid salt plus diepoxide;

(j) a cellulose ether plus an acrylamide monomer, and a free radical initiator or heat;

(k) an allyl substituted cellulose ether plus a free radical initiator or heat.

With regard to the reactive water-soluble polymer and the water-soluble cross-linking agent, it is preferred that the cellulose either is a hydroxypropyl methyl cellulose and the diepoxide is 1,4 butanadiol diglycidyl ether, or butanadiene diepoxide, or the diglycidyl ether of 1,2,3 propane triol, or vinylcyclohexanone dioxide together with zinc fluoroborate as catalyst. When the water-soluble polymer is polyacrylamide, it is preferred that the dialdehyde is glutaraldehyde or glyoxal. When the water-soluble polymer is polyacrylamide it is preferably dissolved in a volatile, water-miscible solvent prior to mixing with the hydraulic cement.

Further, it is preferred that the water-soluble polymer is hydroxypropylmethyl cellulose the sulphone is bis(2-hydroxyethyl) sulphone, or alternatively in place of the sulphone the cross-linking agent is ethylene imine. Another combination to be used in accordance with this invention is when the cellulose ether is hydroxypropylmethyl cellulose the cross-linking agent is one with labile chlorine, preferably dichloropropanol or epichlorohydrin. An alternative cellulose either which may be used in practicing the present invention is hydroxy ethyl cellulose, although other cellulose derivatives may be used including sodium carboxymethyl cellulose.

In a further aspect of the invention the water-soluble polymer may be polyvinyl alcohol, or a partially hydrolysed polyvinyl acetate.

In another form of the invention, the cellulose ether is hydroxypropylmethyl cellulose and the acrylamide monomer is methylene bis-acrylamide.

The water soluble polymer may be allyl substituted cellulose ether, such as acrylamido methylated cellulose and the free radical initiator may be potassium persulphate or nitrile N-oxide. Alternatively the allyl substituted cellulose ether may be allyl hydroxypropylmethyl cellulose and the free radical initiator may be potassium persulphate with sodium bisulphate.

The cementitious composition according to the present invention may contain, in addition to the cement, water and processing aid, other materials known in the art. For example these materials may include fibrous materials, fine fillers, dispersants and chemical modifiers which modify the setting ability of the composition. The fillers and/or aggregates may include slate dust, various forms of sand and the like and these may be mixed with pigments in order to give the finished product a preferred colour. The cementitious composition may furthermore comprise blast furnace slag or pulverised fuel ash or a natural or artificial pozzolana.

In particular it is preferred to include 5 to 20 parts by weight of cement of fine silica particles having a particle size distribution substantially between 50 Å and 0.5 microns, and known variously as silica fume micro-silica or colloidal silica, because of the further improvement in durability which is thereby effected.

The constituents of the cementitious composition are desirably subjected to high shear mixing in order to plasticise the composition and convert it to a smooth paste or a material of dough-like consistency. The high shear mixing may be achieved, for example, in a Z-blade mixer or a twin-roll-mill. The paste or dough-like material is then compressed and maintained under pressure until hardened in order to remove substantially all of the larger voids in the material. Alternatively, it is sometimes advantageous to mix the particulate ingredients of the cementitious composition in some form of planetary mixer, for example, before adding the liquid ingredients during a second high shear mixing process under vacuum, for example in a vacuum extruder when the need to press for extended periods is thereby eliminated.

It is to be understood therefore that the invention also includes a method of making a cementitious composition wherein the specified ingredients (a), (b), (c) and (d) are mixed under conditions of high shear to produce a uniform composition and to remove all or substantially all of the voids from the composition and to convert the composition into a material of dough like consistency. It is preferred that a material of dough like consistency is such that after hardening of the composition the composition has less than 2% of the apparent volume of the product of pores having a size of less than 100 microns, and preferably the composition has less than 2% of the apparent volume of the product of pores having a size of less than 50 microns, and more preferably the composition has less 2% of the apparent volume of the product of pores having a size in the range of 2 to 15 microns.

The dough-like material may subsequently be set and cured in a way generally known in the art to produce the finished product. This process may include pressing of the material and/or forming into a desired shape of product and may also include curing which may be effected in a humid atmosphere for example up to 100% relative humidity, and/or with the application of heat of the product. The curing may be effected in an autoclave and the temperature may be above 100° C.; such a temperature is to be preferred when the cementitious composition contains the mixture of lime and silica as the hydraulic cement.

The cementitious composition may also comprise fibrous or textile reinforcement and in some applications it is preferred that the water-soluble polymer is also chemically cross-linked to the fibrous or textile reinforcement. It is preferred that the fibre is fibrillated polyethylene or polypropylene or a co-polymer of ethylene and propylene, such fibre having a secant elastic modulus of at least 10 GPa measured at 0.1% elongation.

The materials and processes described may be used, for example, to produce building products such as tiles, artificial slates, pipes and other moulded items for use in conditions exposed to natural weathering or water. The invention is particularly suitable for providing roofing elements or for cladding the exterior walls of buildings.

It is preferred that a cross-linking agent is used which is relatively stable at ambient temperature; it is to be understood that such a cross-linking agent enables the composition to be handled and processed without complications arising from cross-linking of the water-soluble polymer; the use of a cross-linking agent which is relatively stable at ambient temperature is particularly preferred for the production of the cementitious composition in accordance with this invention which contains the above defined ingredients (a), (b) and (d) and which merely requires the subsequent addition of an appropriate amount of water when the composition is to be used in the production of a hardened cementitious product.

It is preferred that the amount of cross-linking agent is stoichiometrically sufficient to react with all available sites within the polymer; however, lower quantities for example 50% or greater may also be used.

EXAMPLES

The invention will now be described by way of example. The following examples are not to be construed as limitations upon the overall scope of the invention.

EXAMPLE 1

1000 grams of rapid hardening Portland cement were mixed with 10 grams of hydroxypropylmethyl cellulose powder in a planetary mixer for one minute. 154 grams of a solution of 8.7 parts by weight of bis (2-hydroxyethyl) sulphone in 100 parts water were then added slowly to the mix while mixing continued. After two minutes of further mixing, the crumb which resulted was transferred to the almost closed nip of a two roll mill. As the mix became plastic the nip was gradually opened to about 4mm, at which time a continuous band of material had formed on the faster moving roll of the mill. This was removed by use of a doctor blade and pressed between smooth plattens at 5 MPa and room temperature for 18 hours. The hardened sheet was then removed from the press and cured at 50° C. and 100% relative humidity for 16 hours. The sheet was then cut into test coupons 150 mm×20 mm×5 mm and allowed to dry naturally at ambient conditions for 13 days. Some of the coupons were then immersed in water for 24 hours at room temperature. All coupons were tested by three-point bending and using the formula:

$$S = (3 \, Wl/2 \, bd^2)$$

where
S=flexural strength
W=breaking load
l=span between supports and centre loading point
b=width
d=thickness
the following results were obtained:
Dry strength=38 MPa
Wet strength=41 MPa These may be compared with average value of 38 MPa for the dry conditions and 36 MPa for the wet condition when the same procedure and composition was used but the sulphone was omitted.

The typical freeze-thaw test referred to is one in which the main cycle consists of maintaining the test pieces with one face in contact with water by placing on saturated foam rubber for 5 days while alternating the temperature from +20° C. to −20° C. twice a day thereby giving 10 cycles of freeze and thaw in this period.

During the alternating cycle, the temperature of −20° C. is maintained for 10 hours followed by +20° C. for 2 hours. The cooling from +20° C. to −20° C. is effected in about 30 mins. and the heating from −20° C. tp +20° C. is effected in about 30 mins.

This is followed by subjecting the test pieces to a temperature of 70° C. in air for 2 days at a low relative humidity. When subjected to the freeze-thaw test as defined above 100% of the samples were still intact after 60 of the main cycles whereas materials made in the same way without the addition of sulphone on average only exhibited 32% survival after this number of cycles.

The durability of these materials was further tested by subjecting test coupons to alternate wetting and drying. Once cycle consisted of immersion in water for 7 hours at room temperature, followed by drying at 70° C. for 16 hours and 1 hour cooling at ambient laboratory conditions. Samples of the material described above containing the sulphone cross-linking agent, in some instances, survived more than 60 cycles of the wet/dry cycling procedure, whereas samples of similar material made without sulphone failed by cracking after 7 cycles.

EXAMPLE 2

Example 1 was repeated but with a different water soluble polymer and cross-linking agent, namely 7.5 grams of hydroxypropyl methyl cellulose powder and 149 grams of a solution of 5.2 parts by weight of bis(2-hydroxyethyl) sulphone in 100 parts of water. Pressing time was 22 hours. When tested in three-point bending as defined in Example 1 the following results were obtained:
Dry strength=38 MPa
Wet strength=39 MPA When subjected to the freeze-thaw test as defined above 100% of the samples were still intact after 60 of the main cycles whereas materials made in the same way without the addition of sulphone on average only exhibited 32% survival after this number of cycles.

EXAMPLE 3

Example 1 was repeated but with a different water soluble polymer and cross-linking agent, namely 150 g of a solution of 7.14 parts by weight 1,4 butandiol diglycidylether in 100 parts water. Towards the end of the planetary mixing stage 14 g of a solution of 22.8 parts zinc fluoroborate in 100 parts water was blended into the crumb. The milled material was pressed for 17 hours at room temperature. When tested in three-point bending as defined in Example 1 the following results were obtained:
Dry strength=37 MPa
Wet Strength=38 MPa When subjected to the freeze-thaw test as defined above 100% of the samples were still intact after 40 of the main cycles whereas materials made in the same way without the addition of a cross-linking agent on average only exhibited 34% survival after this number of cycles.

When subjected to the wet/dry cycling test described in the above examples, samples of the material cross-linked with butandiol digylcidyl ether survived 30 cycles.

EXAMPLE 4

Example 2 was repeated but with 2.5 parts by weight of chopped polypropylene fibre added during the mixing process on the roll-mill. The cured product was subjected to the wet/dry cycling test described in Example 1. This material cracked only after 66 cycles of this test whereas a similar fibre reinforced material in which the sulphone cross-linking agent had been omitted cracked within 54 cycles.

EXAMPLE 5

A material of the same composition described in Example 3, but with the addition of 2.5 parts by weight of chopped polypropylene fibre and processed in the manner described in Example 4 was subjected to the wet/dry cycling test described in Example 1. This material cracked only after 75 cycles which may again be compared with cracking within 54 cycles observed for similar material in which the cross-linking agent had been omitted.

EXAMPLE 6

Example 3 was repeated except that 150 g of silica fume was added in place of an equal weight of cement and an additional 20 g of water was added to render the mixture more workable. When tested in three-point bending as defined in Example 1 the following results were obtained:

Dry strength = 21 MPa
Wet strength = 27 MPa

What is claimed is:

1. An uncured cementitious dough-like or paste-like composition comprising in admixture:
   (a) at least one hydraulic cement;
   (b) at least one reactive water-soluble polymer capable of being cross-linked which is capable of providing a viscous solution in water at low addition levels;
   (c) water in an amount of from 10 to 25 parts by weight of water per 100 parts by weight of the cement; and
   (d) a water soluble cross-linking agent capable of effecting chemical cross-links between molecules of the said polymer in the presence of the cement and water.

2. A composition according to claim 1, wherein the admixture comprises from 0.2 to 5 parts by weight of the water-soluble polymer per 100 parts per weight of the cement.

3. A cementitious composition according to claim 1, wherein the reactive water-soluble polymer and the water-soluble cross-linking agent consists of at least one of the pairs selected from the group consisting of:
   (a) a cellulose ether plus a diepoxide;
   (b) a cellulose ether plus a sulphone;
   (c) a cellulose ether plus a compound containing labile chlorine;
   (d) a cellulose ether plus ethylene imine;
   (e) a carboxycellulose ether with polyvalent cation;
   (f) polyacrylamide, or a derivative thereof or a co-polymer of acrylamide plus a dialdehyde;
   (g) polyvinylalcohol or partially hydrolised polyvinylacetate plus an inorganic acid;
   (h) gelatin plus formaldehyde;
   (i) polyacrylic acid or polyacrylic acid salt plus diexpoxide;
   (j) a cellulose ether plus an acrylamide monomer, and a free radical initiator or heat;
   (k) an allyl substituted cellulose ether plus a free radical initiator or heat.

4. A cementitious composition according to claim 1, wherein the composition comprises hydroxypropylmethyl cellulose and a diepoxide selected from the group consisting of 1,4 butanadiol diglycidyl ether, butadiene diepoxide, and the diglycidyl ether of 1,2,3 propane triol, together with zinc fluoroborate catalyst.

5. A cementitious composition according to claim 1 wherein the composition comprises polyacrylamide and dialdehyde and which composition is prepared by dissolving the polyacrylamide in a volatile, water-miscible solvent prior to mixing with the cement.

6. A cementitious composition according to claim 5, wherein the dialdehyde is glutaraldehyde.

7. A cementitious composition according to claim 5, wherein the dialdehyde is glyoxal.

8. A cementitious composition according to claim 1, wherein the composition comprises hydroxypropylmethyl cellulose and bis(2-hydroxyethyl) sulphone.

9. A cementitious composition according to claim 1, wherein the composition comprises hydroxypropylmethyl cellulose and ethylene imine.

10. A cementitious composition according to claim 1, wherein the composition comprises hydroxypropylmethyl cellulose and 1,3-dichloropropanol.

11. A cementitious composition according to claim 1, wherein the composition comprises hydroxypropylmethyl cellulose and epichlorohydrin.

12. A cementitious composition according to claim 1, wherein the composition comprises hydroxypropylmethyl cellulose and methylene bis-acrylamide.

13. A cementitious composition according to claim 1, wherein the composition comprises acrylamido methylated cellulose and a free radical initiator selected from the group consisting of potassium persulphate and nitrile N-oxide.

14. A cementitious composition according to claim 1, wherein the composition comprises allyl hydroxypropylmethyl cellulose and potassium persulphate with sodium bisulphate.

15. A cementitious composition according to claim 1, wherein the composition comprises hydroxyethyl cellulose and bis(2hydroxyethyl) sulphone.

16. A cementitious composition according to claim 1, wherein the hydraulic cement is selected from the group consisting of ordinary Portland cement and rapid hardening Portland cement.

17. A cementitious composition according to claim 1 which also contains inert fillers.

18. A cementitious composition according to claim 1 comprising a material selected from the group consisting of blast furnace slag, pulverised fuel ash, a natural pozzolana and an artificial pozzolana.

19. A cementitious composition according to claim 1 which also comprises 5 to 20 parts by weight of fine particles of silica having a particle size distribution substantially between 50 A and 0.5 microns.

20. A cementitious composition according to claim 19, wherein the amount of silica is from 12 to 16 parts by weight.

21. A cementitious composition according to claim 1 which also comprises fibrous or textile reinforcement.

22. A cementitious composition according to claim 21 in which the fibre is selected from the group consisting of fibrillated polyethylene, polypropylene and a co-polymer of ethylene and propylene, such fibre having a secant elastic modulus of at least 10 GPa measured at 0.1% elongation.

23. A cementitious composition according to claim 21 in which the reactive water-soluble polymer is also chemically cross-linked to the fibrous or textile reinforcement.

24. A hardened cementitious composition in which the initially water-soluble polymer is cross-linked and which is made from a composition as claimed in claim 1.

25. A cementitious composition according to claim 24 and containing a mixture of lime and silica as the hydraulic cement, wherein the composition is hardened by heating at a temperature above 100° C.

26. A cementitious composition as claimed in claim 25 wherein the heating is effected in an autoclave.

27. A hardened cementitious composition according to claim 24 in the form of a roofing element or cladding element for the exterior walls of buildings.

28. A method of making a cementitious composition according to claim 1, wherein the ingredients (a), (b), (c) and (d) are mixed to produce a uniform composition and the resulting composition is then subjected to high shear mixing in order to plasticise the composition to a dough-like or paste-like consistency from which the voids are substantially removed by subjecting the soft material to vacuum, or by applying pressure until the material has hardened.

29. A method as claimed in claim 28, wherein the high shear mixing is effected using a twin-roll mill or an extruder.

30. A cementitious product when prepared by the method of claim 28.

31. A hardened composition according to claim 30, wherein the composition has less than 2% of the apparent volume of the product of pores having a size of less than 100 microns.

32. A cementitious composition according to claim 31, wherein the composition has less than 2% of the apparent volume of the product of pores having a size of less than 50 microns.

33. A cementitious composition according to claim 32, wherein the composition has less than 2% of the apparent volume of the product of pores having a size in the range of 2 to 15 microns.

34. A hardened cementitious composition as claimed in claim 31 in the form of a roofing element, such as a roofing tile, or a cladding element for the exterior walls of buildings.

* * * * *